United States Patent
Taga et al.

(10) Patent No.: US 7,206,279 B2
(45) Date of Patent: Apr. 17, 2007

(54) OFDM RECEIVING APPARATUS AND METHOD OF DEMODULATION IN OFDM RECEIVING APPARATUS

(75) Inventors: Noboru Taga, Kanagawa-ken (JP); Takashi Seki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 980 days.

(21) Appl. No.: 10/389,951

(22) Filed: Mar. 18, 2003

(65) Prior Publication Data

US 2003/0185147 A1 Oct. 2, 2003

(30) Foreign Application Priority Data

Mar. 26, 2002 (JP) .............................. 2002-085451

(51) Int. Cl.
*H04J 11/00* (2006.01)
(52) U.S. Cl. ...................................... 370/208; 375/326
(58) Field of Classification Search ................ 370/208; 375/326
See application file for complete search history.

(56) References Cited

U.S. PATENT DOCUMENTS

| | | | |
|---|---|---|---|
| 5,406,551 A * | 4/1995 | Saito et al. ................. 370/203 |
| 5,600,672 A * | 2/1997 | Oshima et al. ............. 375/219 |
| 5,694,389 A * | 12/1997 | Seki et al. .................. 370/208 |
| 5,959,965 A | 9/1999 | Ohkubo et al. | |
| 6,028,900 A | 2/2000 | Taura et al. | |
| 6,240,146 B1 | 5/2001 | Stott et al. | |
| 6,552,701 B1* | 4/2003 | Tanaka ......................... 345/63 |
| 2001/0024475 A1* | 9/2001 | Kumar ....................... 375/270 |
| 2001/0050926 A1* | 12/2001 | Kumar ....................... 370/529 |

FOREIGN PATENT DOCUMENTS

| | | |
|---|---|---|
| EP | 1 172 982 A2 | 1/2002 |
| GB | 2 334 836 A | 9/1999 |
| GB | 2 364 868 A | 2/2002 |
| JP | 2000-286819 | 10/2000 |
| JP | 2001-156738 | 6/2001 |
| JP | 2002-158631 | 5/2002 |

OTHER PUBLICATIONS

U.S. Appl. No. 09/987,881, filed Nov. 16, 2001, Seki et al.
U.S. Appl. No. 10/389,951, filed Mar. 18, 2003, Taga et al.

* cited by examiner

*Primary Examiner*—Doris H. To
*Assistant Examiner*—Phuongchau Ba Nguyen
(74) *Attorney, Agent, or Firm*—Oblon, Spivak, McClelland, Maier & Neustadt, P.C.

(57) ABSTRACT

An apparatus for receiving an OFDM modulated signal includes: an A/D converter converting the received signal to a digital signal; a quadrature demodulator performing quadrature detection of the digital signal and converting the digital signal to a base-band signal; an FFT circuit transforming the base-band signal to a signal of a frequency domain by performing a fast Fourier transformation; an equalizer equalizing the signal of the frequency domain and obtaining demodulated data; an error correcting circuit performing error correction and decoding the demodulated data obtained by the equalizer; an interference detector detecting a receiving quality for each predetermined frequency band from the demodulated data; and a synchronous sequencer assigning weights to the base-band signal and the signal of the frequency domain based on the receiving quality data, and reproducing a timing synchronized signal and a clock pulse required for the demodulation.

23 Claims, 7 Drawing Sheets

OFDM RECEIVING APPARATUS AND METHOD OF DEMODULATION IN OFDM RECEIVING APPARATUS

CROSS REFERENCE TO RELATED APPLICATIONS

This application is based upon and claims the benefit of priority from the prior Japanese Patent Application No. 2002-085451 filed on Mar. 26, 2002, the entire contents of which are incorporated herein by reference.

BACKGROUND OF THE INVENTION

1. Field of the Invention

The present invention pertains to an OFDM receiving apparatus for receiving transmission signals using an Orthogonal Frequency Division Multiplex (OFDM) modulation system and a method of demodulation in the OFDM receiving apparatus. In particular, the present invention pertains to a technique for increasing the receiving performance of an OFDM demodulation.

2. Description of the Related Art

For transmission of audio signals and video signals, the development of digital-modulation based transmission systems has recently become very active. In digital terrestrial broadcasting, in particular, Orthogonal Frequency Division Multiplex (OFDM) has been receiving great attention because of features such as its robustness against multipath interference and a higher efficiency in frequency usage.

As several thousands of sub-carriers are multiplexed into transmitted signals in the OFDM modulation system, the transmitted signals are susceptible to carrier phase noise. In the consumer-oriented OFDM receiving apparatus, in particular, the phase noise characteristics of a tuner are an important issue because of limited costs. The effect of the phase noise becomes evident as Common Phase Error (CPE), which shifts the phases of all of the sub-carriers at the same angle.

Japanese Patent Laid Open Publication (Kokai) No. 2000-286819 discloses an OFDM receiving apparatus compensating for the CPE using a known pilot signal assigned to the predetermined sub-carriers so that the receiving performance will not be deteriorated by the phase noise of a tuner.

In the above-described OFDM receiving apparatus, the known pilot signals are inserted into the specific sub-carriers at a transmission side, the difference between the known pilot signal and the received signals are determined at a reception side, and in an internal-symbol average circuit, the average is obtained for the phase error of each sub-carrier for each OFDM symbol. At this time, setting a threshold value according to a receiving level, and obtaining the average in the internal-symbol of the phase error only regarding sub-carriers with a receiving level higher than the threshold value, when multipass interference exists, the accuracy of the phase error information can be insured. And then, phase rotation of the received signals can be performed using the phase error information so that the phase noise of the tuner may be compensated for.

The sub-carriers used for the phase error detection are judged only on the receiving level in the above OFDM receiving apparatus, although it is effective in deleting the influence of the sub-carriers in which the receiving level fell due to multipass interference. However, in the above OFDM receiving apparatus, since the receiving level of the sub-carriers receiving interference reaches a high level when the same channel interference or Continuous Wave (CW) interference of an analog television signal exists, the sub-carriers of the pilot signal receiving such interference will not be able to be eliminated from the sub-carriers used for the phase error detection, and the accuracy of phase error information will deteriorate.

Moreover, although there is a method of performing timing synchronous reproduction and Automatic Frequency Control (AFC) of a carrier required for the OFDM demodulation by detecting the correlation of the guard period inserted in the OFDM signals, when the same channel interference of the analog television signals or the CW interference exist, the accuracy of the correlation detection value deteriorates, and neither the timing synchronization nor the synchronization of the AFC of carrier is obtained, and receiving becomes impossible.

SUMMARY OF THE INVENTION

An apparatus for receiving an Orthogonal Frequency Division Multiplex (OFDM) modulated signal according to an embodiment of the present invention includes: an A/D converter converting the received signal to a digital signal; a quadrature demodulator performing a quadrature detection of the digital signal converted by the A/D converter and converting the digital signal to a base-band signal of a time domain; a fast Fourier transform circuit transforming the base-band signal converted by the quadrature demodulator to a signal of a frequency domain by performing a fast Fourier transformation; an equalizer equalizing the signal of the frequency domain transformed by the fast Fourier transform circuit and obtaining demodulated data; an error correcting circuit performing an error correction and decoding the demodulated data obtained by the equalizer; an interference detector detecting a receiving quality for each predetermined frequency band from the demodulated data obtained by the equalizer; and a synchronous sequencer assigning weights to the base-band signal of the time domain outputted from the quadrature demodulator and the signal of the frequency domain outputted from the fast Fourier transform circuit, based on the receiving quality detected in the interference detector, and reproducing a timing synchronized signal and a clock pulse required for the demodulation of the receiving signals.

In addition, a method of demodulation in an apparatus for receiving an Orthogonal Frequency Division Multiplex (OFDM) modulated signal according to an embodiment of the present invention includes: converting the received signal to a digital signal; performing a quadrature detection of the digital signal and converting the digital signal to a base-band signal of a time domain; transforming the base-band signal to a signal of a frequency domain by performing a fast Fourier transformation; equalizing the signal of the frequency domain and obtaining demodulated data; performing an error correction and decoding the demodulated data; detecting a receiving quality for each predetermined frequency band from the demodulated data; and assigning weights to the base-band signal of the time domain and the signal of the frequency domain based on the receiving quality, and reproducing a timing synchronized signal and a clock pulse required for the demodulation of the receiving signals.

DETAILED DESCRIPTION

Figure 1:
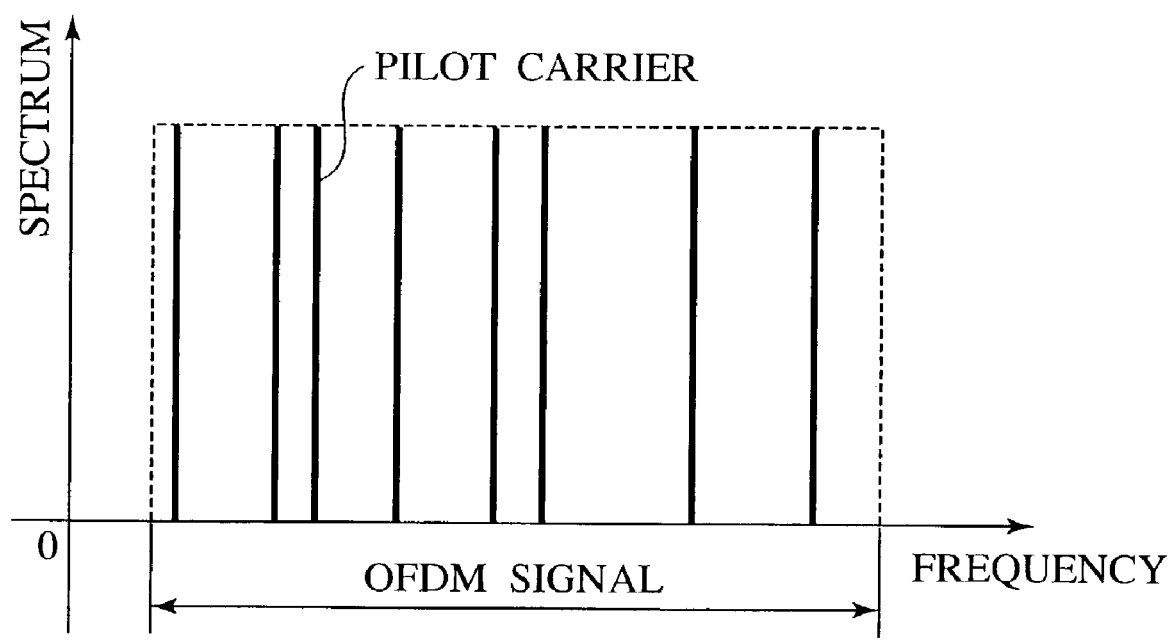
FIG. 1 is an illustration showing pilot signals assigned to the transmission reception according to the OFDM modulation system.

Various embodiments of the present invention will be described herein below with reference to the accompanying drawings. It is to be noted that the same or similar reference numerals are applied to the same or similar parts and elements throughout the drawings, and the description of the same or similar parts and elements will be omitted or simplified.

First Embodiment

Figure 2:
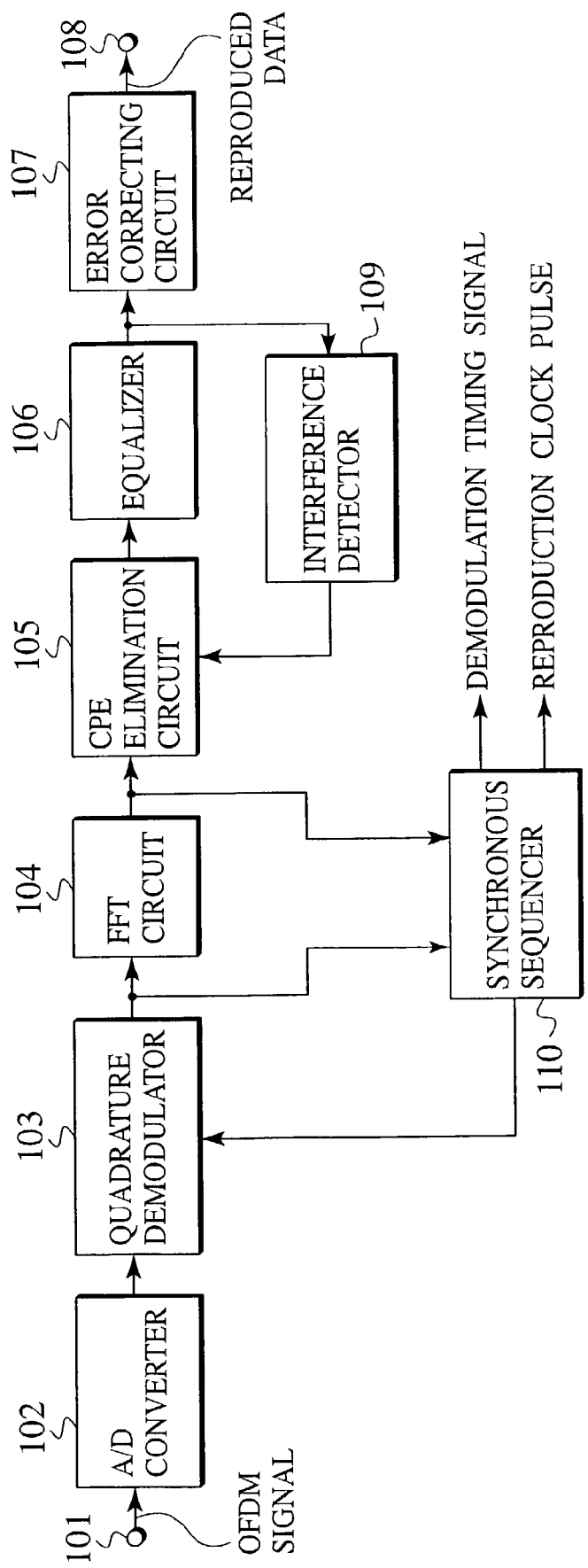
FIG. 2 is a block diagram showing an example of the composition of an OFDM receiving apparatus according to a first embodiment of the present invention.

FIG. 2 is a block diagram showing an example of the composition of an Orthogonal Frequency Division Multiplex (OFDM) receiving apparatus according to a first embodiment. As shown in FIG. 2, the OFDM receiving apparatus includes an Analog to Digital (A/D) converter 102, a quadrature demodulator 103, a Fast Fourier Transform (FFT) circuit 104, a Common Phase Error (CPE) elimination circuit 105, an equalizer 106, an error correcting circuit 107, an interference detector 109, and a synchronous sequencer 110.

The A/D converter 102 converts a received signal to a digital signal. The quadrature demodulator 103 performs quadrature detection of the digital signal and converts the digital signal to a base-band signal of a time domain. The FFT circuit 104 transforms the base-band signal to a signal of a frequency domain by performing a Fast Fourier Transformation (FFT). The CPE elimination circuit 105 assigns weights to the signal of the frequency domain for each predetermined frequency band based on the receiving quality, detects the Common Phase Error (CPE) information of each sub-carrier, and performs phase rotation to eliminate the CPE information from the signal of the frequency domain. The equalizer 106 equalizes the signal of the frequency domain and obtains demodulated data. The error correcting circuit 107 performs error correction and decodes the demodulated data. The interference detector 109 detects the receiving quality of each predetermined frequency band from the demodulated data. The synchronous sequencer 110 inputs the base-band signal of the time domain and the signal of the frequency domain and reproduces a timing signal and a reproduction clock pulse required for the demodulation of the received signal.

Next, the operation of the OFDM receiving apparatus shown in FIG. 2 will be described.

An OFDM modulation wave, received by a tuner (not shown) and converted into an intermediate frequency band signal (hereinafter referred to as IF signal), is inputted to an input terminal 101.

The OFDM modulation wave, is inputted to the A/D converter 102 and converted to a digital signal. Quadrature detection of the converted digital signal is performed by the quadrature demodulator 103, frequency conversion of the digital signal is performed by the frequency control signal outputted from the synchronous sequencer 110 (described later), and the digital signal is converted to an in-phase detection axis signal (I signal) and a quadrature detection axis signal (Q signal) of the base-band signal of the time domain. The base-band signal of the time domain outputted from the quadrature demodulator 103 is inputted to the FFT circuit 104.

The FFT circuit 104 performs Fast Fourier Transform (FFT) to an effective symbol, except a guard period from among the inputted OFDM modulation wave. The output signal outputted from the FFT circuit 104 is inputted to the CPE elimination circuit 105. The CPE elimination circuit 105 assigns weights to the sub-carriers of pilot signals detected in the delay between symbols in order to eliminate those sub-carriers of low quality based on a weighting coefficient outputted from the interference detector 109 (described later), averages within internal-symbol, and detects the Common Phase Error (CPE) attributed to carrier phase noise. Furthermore, the CPE elimination circuit 105 generates the compensation signal to cancel the detected CPE and performs the phase rotation of the signal outputted from the FFT circuit 104.

The output signal outputted from the CPE elimination circuit 105 is supplied to the equalizer 106. The equalizer 106 presumes and compensates for a distortion in the propagation path using the pilot signal for equalizing inserted beforehand in the OFDM signal. The sub-carrier of the pilot signal used for the CPE detection is also equalized for interference detection in the equalizer 106. The output signal outputted from the equalizer 106 is supplied to the error correcting circuit 107. The error correcting circuit 107 performs error correcting and decodes the demodulated data. The error corrected and decoded signal is outputted from output terminal 108 as reproduced data.

On the other hand, the output signal of the equalizer 106 is inputted to the interference detector 109. The interference detector 109 detects the variance from a reference signal point of the pilot signal for each sub-carrier of the pilot signal and outputs the weighting coefficient to the CPE elimination circuit 105 as the receiving quality data based on the result of the variance detection.

The synchronous sequencer 110 inputs the base-band signal of the time domain outputted from the quadrature demodulator 103 and the signal of the frequency domain outputted from the FFT circuit 104, reproduces the timing synchronized signal required for the OFDM demodulation, reproduces the clock pulse from the inputted signal, and supplies the timing synchronized signal and the reproduction clock pulse to each circuit. Further, the synchronous sequencer 110 detects an error in carrier frequency and supplies a frequency control signal to cancel the detected frequency error to the quadrature demodulator 103. As a method of performing timing synchronous reproduction and clock reproduction, there is a method which uses the correlation of the guard period in the signal of the time domain. As a method of performing error detection in carrier frequency, there is a method which uses the arrangement of the sub-carriers of the pilot signal in the signal of the frequency domain or a method of combining the correlation of the guard period in the signal of the time domain.

Figure 3:
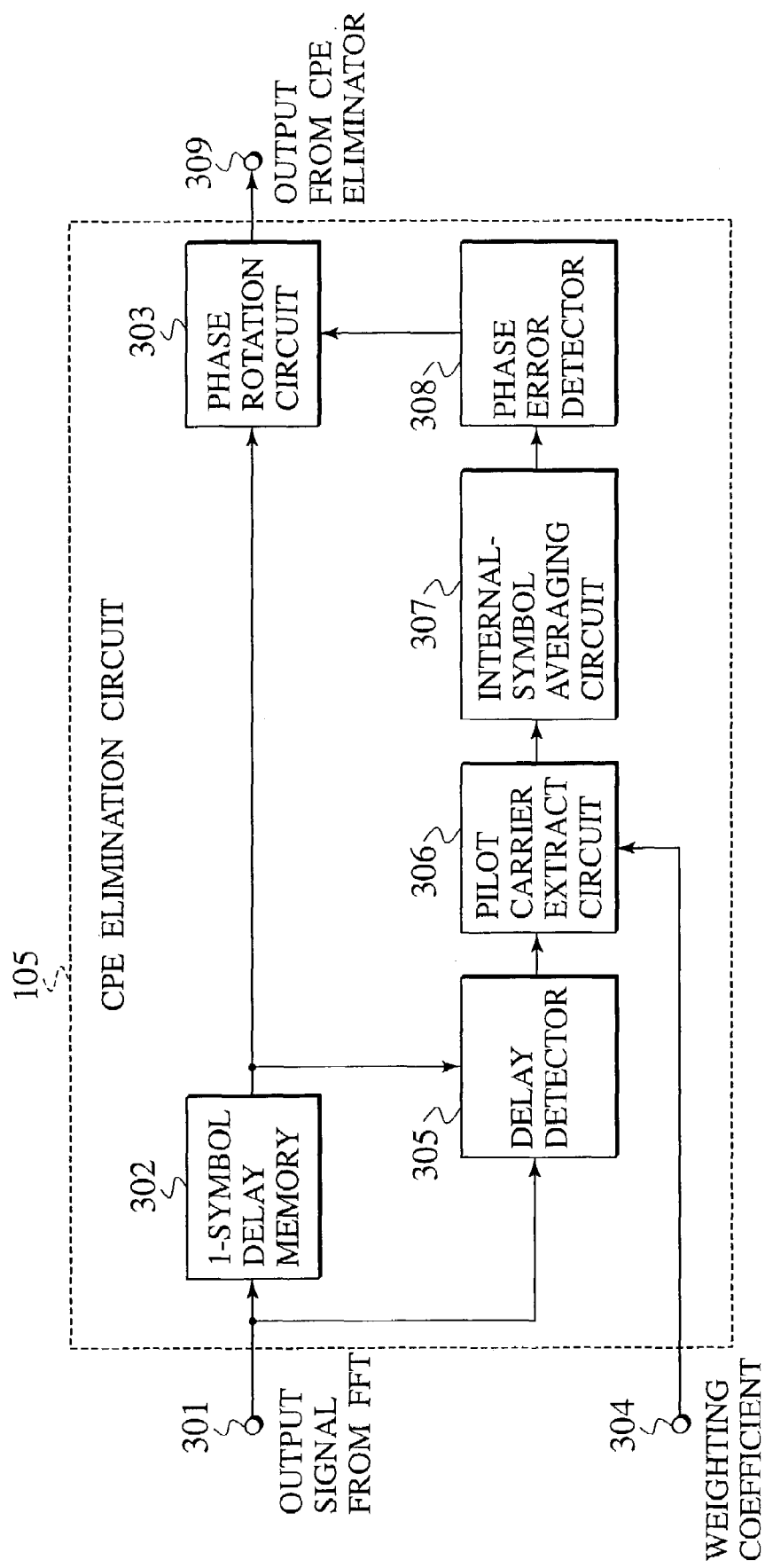
FIG. 3 is a block diagram showing an example of the composition of a CPE elimination circuit of the OFDM receiving apparatus shown in FIG. 2.

FIG. 3 is a block diagram showing an example of the composition of the CPE elimination circuit 105. As shown in FIG. 3, the CPE elimination circuit 105 includes a 1-symbol delay memory 302, a phase rotation circuit 303, a delay detector 305, a pilot carrier extract circuit 306, an internal-symbol averaging circuit 307, and a phase error detector 308.

The output signal outputted from the FFT circuit 104 is supplied to an input terminal 301 of the CPE elimination circuit 105. The signal supplied to the input terminal 301 branches in two directions, the signal of one side is inputted into 1-symbol delay memory 302 and delayed by one symbol. The other signal is inputted into the delay detector 305, and delay detection between the symbols in the signal outputted from 1-symbol delay memory 302 is performed in the delay detection circuit 305.

The signal performed the delay detection in the delay detector 305 is inputted into the pilot carrier extract circuit 306 and only the sub-carrier of the pilot signal used for the CPE detection is extracted in the pilot carrier extract circuit 306.

Further, the weight coefficient outputted from the interference detector 109 is supplied to an input terminal 304, the weight coefficient is supplied to the pilot carrier extract circuit 306 from the input terminal 304. The pilot carrier extract circuit 306 assigns weights to the sub-carriers of the pilot signal used for the CPE detection, based on the weight coefficient. In the interference detector 109, for example, when the detection result of variance is larger than a predetermined value, the weight coefficient is set to "0", and when the detection result of variance is below the predetermined value, the weight coefficient is set to "1". The sub-carriers of the pilot signal affected by Continuous Wave (CW) interference are not outputted from the pilot carrier extract circuit 306, by excepting the sub-carriers of the pilot signal whose weight coefficient is "0" in the pilot carrier extract circuit 306, these can be excepted from the sub-carriers used for the CPE detection.

The output signal outputted from the pilot carrier extract circuit 306 is supplied to the internal-symbol averaging circuit 307, and an average of internal-symbol is determined in symbol regarding the I signal and Q signal respectively in the internal-symbol averaging circuit 307. The result of the average value is inputted to the phase error detector 308, and the Common Phase Error (CPE) is detected by an arc tangent operation in the phase error detector 308.

The result of the CPE detection outputted from the phase error detector 308 is inputted to the phase rotation circuit 303, and the output signal outputted from the 1-symbol delay memory 302 is also supplied to the phase rotation circuit 303. Then, the signal outputted from 1-symbol delay memory 302 is rotated to cancel the CPE by the phase rotation circuit 303, and the rotated signal is outputted to an output terminal 309. The signal outputted from the output terminal 309 is supplied to the equalizer 106.

Figure 4:
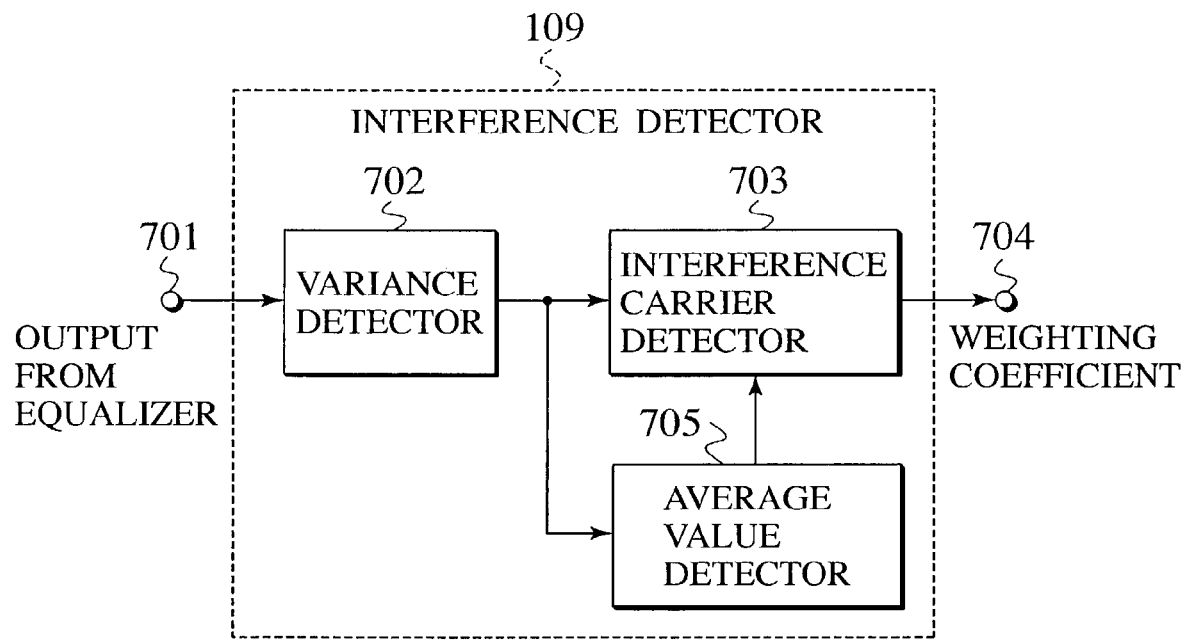
FIG. 4 is a block diagram showing an example of the composition of an interference detector of the OFDM receiving apparatus shown in FIG. 2.

FIG. 4 is a block diagram showing an example of the composition of the interference detector 109. As shown in FIG. 4, the CPE interference detector 109 includes a variance detector 702, an average value detector 705, and an interference carrier detector 703. The variance detector 702 detects variance information from the predetermined reference signal point for each of the sub-carriers. The average value detector 705 calculates the average value of the variance information for each of the sub-carriers. The interference carrier detector 703 generates the receiving quality from the variance information and the average values for each of the sub-carriers.

Figure 5:
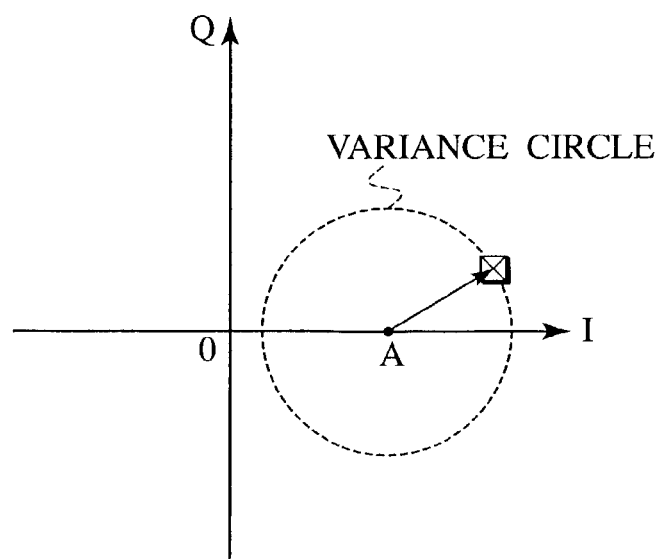
FIG. 5 is an illustration showing a distributed detection from the reference signal point by the interference detector shown in FIG. 4.

The equalized signal outputted from the equalizer 106 is supplied to an input terminal 701 of the interference detector 109, and the equalized signal is inputted to the variance detector 702. The variance detector 702, as shown in FIG. 5, detects the variance from the reference signal point A of the pilot signal for each sub-carrier.

The result of the variance detection is inputted into both the average value detector 705 and the interference carrier detector 703. The average value detector 705 computes the average value of all of the sub-carriers in which the interference detector 702 detected variance. Therefore, even if the result of the variance detection becomes large under the low Carrier to Noise (C/N) Ratio, incorrect detection of CW interference in the interference carrier detector 703 can be prevented.

The interference carrier detector 703 inputs the result of the variance detection from the variance detector 702, inputs the average value of the variance from the average value detector 705, and outputs the weight coefficient for each of sub-carriers as receiving quality data to an output terminal 704.

As explained above, according to the first embodiment, the variance from the reference signal point A of the pilot signal is detected for each sub-carrier of the pilot signal using the equalized output signal from the equalizer 106, weight coefficient of the sub-carriers of the pilot signal used for the CPE elimination circuit 105 is assigned based on the variance detection, and those sub-carriers of low quality are eliminated. Therefore, even if the sub-carriers of the pilot signal have received the same channel interference of analog TV signals or the CW interference of arbitrary frequency, the interference can be detected and the CPE can be detected with high accuracy.

Figure 6:
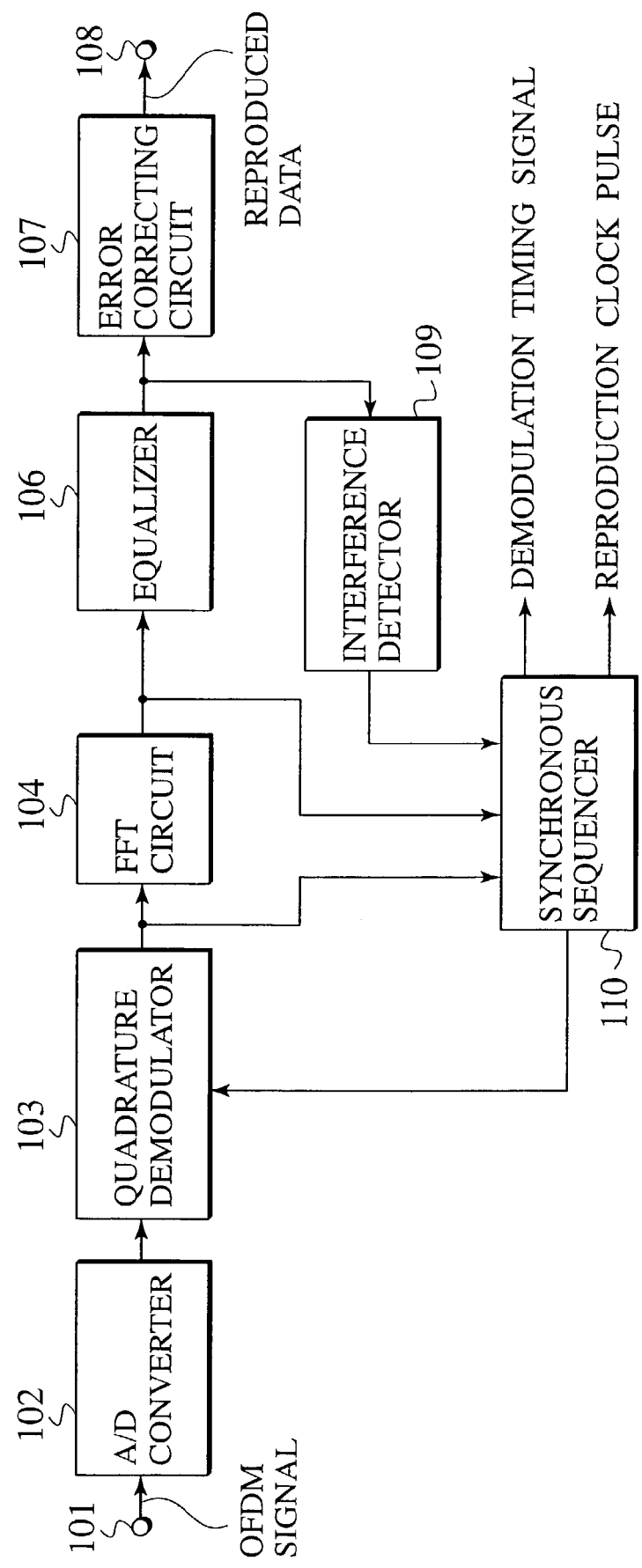
FIG. 6 is a block diagram showing another example of the composition of an OFDM receiving apparatus according to the first embodiment of the present invention.

FIG. 6 is a block diagram showing another example of an Orthogonal Frequency Division Multiplex (OFDM) receiving apparatus according to the first embodiment.

As shown in FIG. 6, the synchronous sequencer 110 assigns weights to both the base-band signal of the time domain outputted from the quadrature demodulator 103 and the signal of the frequency domain outputted from the FFT circuit 104, based on the receiving quality data (the weight coefficient) detected in the interference detector 109, and reproduces the timing synchronized signal and the clock pulse required for the OFDM demodulation of the receiving signals.

Therefore, those receiving signals of low quality, which received same channel interference of analog TV signals or the CW interference of arbitrary frequency, can be eliminated, and the quality of the both the timing synchronized signal and the reproduction clock pulse required for the OFDM demodulation can be raised without degrading the correlation detection characteristic of the guard period.

Second Embodiment

Figure 7:
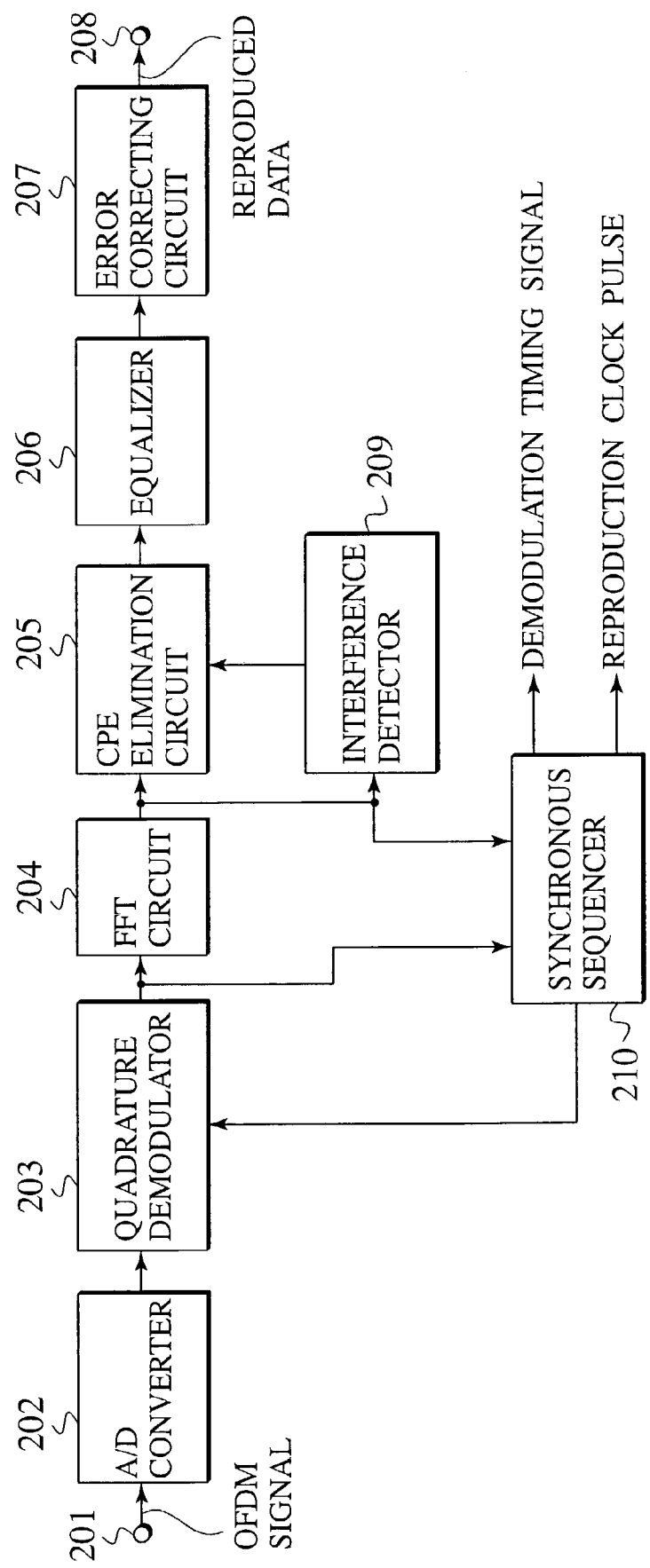
FIG. 7 is a block diagram showing an example of the composition of an OFDM receiving apparatus according to a second embodiment of the present invention.

FIG. 7 is a block diagram showing an example of the composition of an OFDM receiving apparatus according to the second embodiment of the present invention. As shown in FIG. 7, the OFDM receiving apparatus includes an A/D converter 202, a quadrature demodulator 203, a Fast Fourier Transform (FFT) circuit 204, a common phase error (CPE)

elimination circuit 205, an equalizer 206, an error correcting circuit 207, an interference detector 209, and a synchronous sequencer 210.

The operation of the OFDM receiving apparatus shown in FIG. 7 will be described herein below.

An OFDM modulation wave received by a tuner (not shown) and converted into an IF signal, is inputted to an input terminal 201.

The OFDM modulation wave is inputted to the A/D converter 202 and converted to a digital signal. Quadrature detection of the converted digital signal is performed by the quadrature demodulator 203, frequency conversion of the digital signal is performed by the frequency control signal outputted from the synchronous sequencer 210 (described later), and the digital signal is converted to an in-phase detection axis signal (I signal) and a quadrature detection axis signal (Q signal) of the base-band signal of the time domain. The base-band signal of the time domain outputted from the quadrature demodulator 203 is inputted to the FFT circuit 204.

The FFT circuit 204 performs Fast Fourier Transform (FFT) to an effective symbol except, a guard period from among the inputted OFDM modulation wave. The output signal outputted from the FFT circuit 204 is inputted to the CPE elimination circuit 205. The CPE elimination circuit 205 assigns weights to the sub-carriers of the pilot signals detected in the delay between symbols in order to eliminate those sub-carriers of low quality based on a weighting coefficient outputted from the interference detector 209 (described later), averages within internal-symbol, and detects a common phase error (CPE) attributed to carrier phase noise. Furthermore, the CPE elimination circuit 205 generates a compensation signal to cancel the detected CPE and performs the phase rotation of the signal outputted from the FFT circuit 204.

The output signal outputted from the CPE elimination circuit 205 is supplied to the equalizer 206. The equalizer 206 presumes and compensates for a distortion in the propagation path using the pilot signal for equalizing inserted beforehand in the OFDM signal. The sub-carrier of the pilot signal used for CPE detection is also equalized for interference detection in the equalizer 206. The output signal outputted from the equalizer 206 is supplied to the error correcting circuit 207. The error correcting circuit 207 performs error correcting and decodes the demodulated data. The error corrected and decoded signal is outputted from output terminal 208 as reproduced data.

On the other hand, the output signal from the FFT circuit 204 is also inputted into the interference detector 209. The interference detector 209 detects the variance from the reference signal point of the pilot signal for each sub-carrier of the pilot signal, and outputs the weighting coefficient to the CPE elimination circuit 205 as the receiving quality data based on the result of the variance detection.

The synchronous sequencer 210 inputs the base-band signal of the time domain outputted from the quadrature demodulator 203 and the signal of the frequency domain outputted from the FFT circuit 204, reproduces the timing synchronized signal required for the OFDM demodulation, reproduces the clock pulse from the inputted signal, and supplies the timing synchronized signal and the reproduction clock pulse to each circuit. Further, the synchronous sequencer 210 detects the error in carrier frequency and supplies the frequency control signal to cancel the detected frequency error to the quadrature demodulator 203.

As explained above, according to the second embodiment, the variance from the reference signal point A of the pilot signal is detected for each sub-carrier of the pilot signal using the output signal from the FFT circuit 204, weight coefficient of the sub-carrier of the pilot signal used for the CPE elimination circuit 205 is assigned based on the variance detection, and those sub-carriers of low quality are eliminated. Therefore, even if the sub-carriers of the pilot signal have received same channel interference of analog TV signals or the CW interference of arbitrary frequency, the interference can be detected and the CPE can be detected with high accuracy.

Third Embodiment

Figure 8:
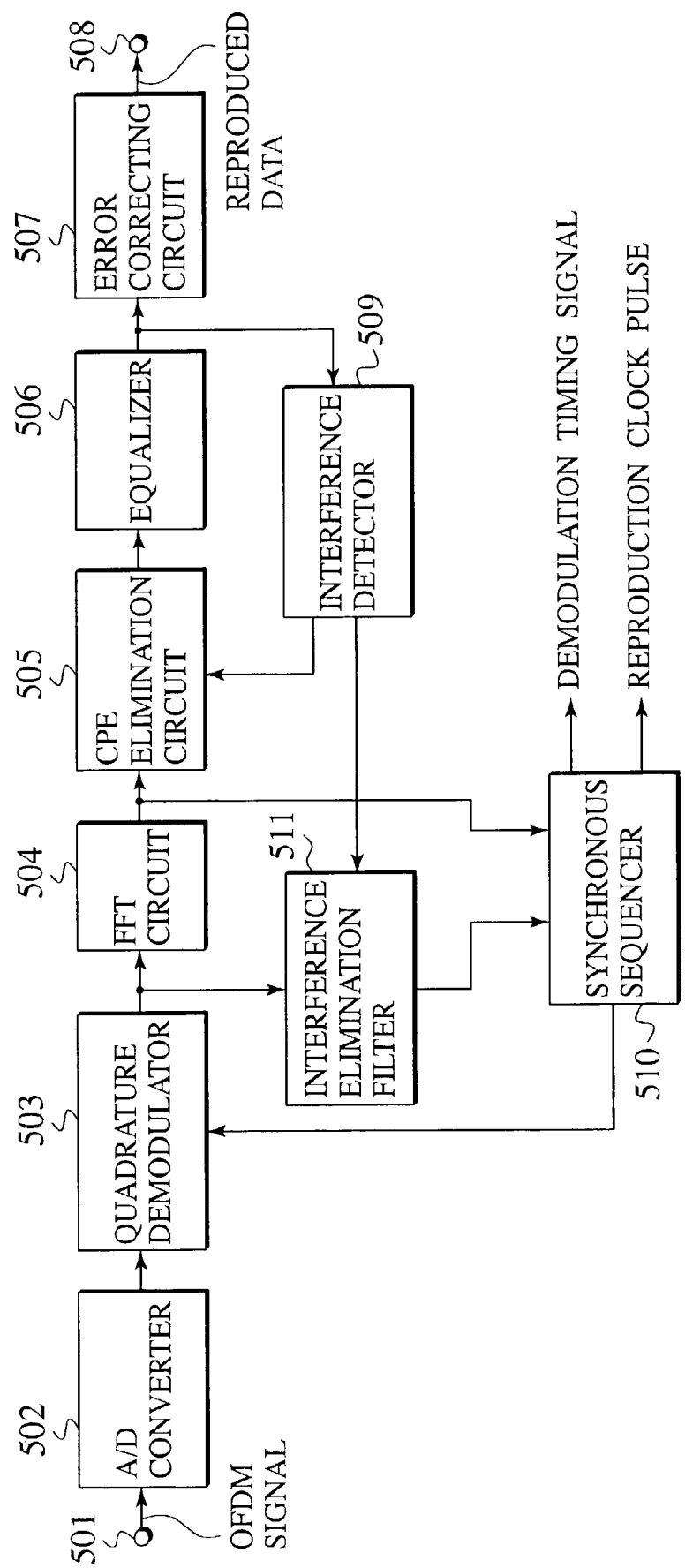
FIG. 8 is a block diagram showing an example of the composition of an OFDM receiving apparatus according to a third embodiment of the present invention.

FIG. 8 is a block diagram showing an example of the composition of an OFDM receiving apparatus according to the third embodiment of the present invention. As shown in FIG. 8, the OFDM receiving apparatus includes an A/D converter 502, a quadrature demodulator 503, an Fast Fourier Transform (FFT) circuit 504, a common phase error (CPE) elimination circuit 505, an equalizer 506, an error correcting circuit 507, an interference detector 509, and a synchronous sequencer 510. An interference elimination filter 511 modifies a frequency band-pass for outputting the signal of the time domain outputted from the quadrature demodulator 503 to the synchronous sequencer 510, based on a receiving quality detected by the interference detector 509.

The operation of the OFDM receiving apparatus shown in FIG. 8 will be described herein below.

An OFDM modulation wave received by a tuner (not shown) and converted into an IF signal is inputted into an input terminal 501.

The OFDM modulation wave is inputted to the A/D converter 502 and converted to a digital signal. Quadrature detection of the converted digital signal is performed by the quadrature demodulator 503, frequency conversion of the digital signal is performed by the frequency control signal outputted from the synchronous sequencer 510 (described later), and the digital signal is converted to an in-phase detection axis signal (I signal) and a quadrature detection axis signal (Q signal) of the base-band signal of the time domain. The base-band signal of the time domain outputted from the quadrature demodulator 503 is inputted to the FFT circuit 504.

The FFT circuit 504 performs Fast Fourier Transform (FFT) to an effective symbol except a guard period from among the inputted OFDM modulation wave. The output signal outputted from the FFT circuit 504 is inputted to the CPE elimination circuit 505.

The CPE elimination circuit 505 assigns weights the sub-carriers of the pilot signal detected in the delay between symbols in order to eliminate those sub-carriers of low quality based on a weighting coefficient outputted from the interference detector 509 (described later), averages within internal-symbol, and detects a common phase error (CPE) attributed to carrier phase noise. Furthermore, the CPE elimination circuit 505 generates a compensation signal to cancel the detected CPE and performs the phase rotation of the signal outputted from the FFT circuit 504.

The output signal outputted from the CPE elimination circuit 505 is supplied to the equalizer 506. The equalizer 506 presumes and compensates for a distortion in the propagation path using the pilot signal for equalizing inserted beforehand in the OFDM signal. The sub-carrier of the pilot signal used for the error detection is also equalized for interference detection in the equalizer 506. The output signal outputted from the equalizer 506 is supplied to the error correcting circuit 507. The error correcting circuit 507 performs error correcting and decodes the demodulated data. The error corrected and decoded signal is outputted from output terminal 508 as reproduced data.

On the other hand, the output signal from equalizer 506 is also inputted to the interference detector 509. The interference detector 509 detects the variance from the reference signal point of the pilot signal for each sub-carrier of the pilot signal, and outputs the weighting coefficient to the CPE elimination circuit 505 as the receiving quality data based on the result of the variance detection. Furthermore, the interference detector 509 determines the frequency band in which the interference exists from the result of the variance detection, and outputs interference detection information to the interference elimination filter 511.

The interference elimination filter 511 is able to modify the frequency band-pass based on the interference detection. The interference elimination filter 511, for example, is configured to calculate and modify a filter coefficient to reject signals in the frequency band in which the interference detected in the interference detector 509 exists at least. The interference elimination filter 511 inputs the base-band signal of the time domain outputted from the quadrature demodulator 503, eliminates those signals of low quality based on the filter coefficient, and outputs the base-band signal of the time domain to the synchronous sequencer 510 after the interference elimination.

The synchronous sequencer 510 inputs the base-band signal of a time domain outputted from the interference elimination filter 511 and the signal of the frequency domain outputted from the FFT circuit 504, reproduces the timing synchronized signal required for the OFDM demodulation, reproduces the clock pulse from the inputted signal, and supplies the timing synchronized signal and the reproduction clock pulse to each circuit. Further, the synchronous sequencer 510 detects the error of carrier frequency and supplies the frequency control signal to cancel the detected frequency error to the quadrature demodulator 503.

As explained above, according to the third embodiment, the variance from the reference signal point A of the pilot signal is detected for each sub-carrier of the pilot signal using the equalized output signal from the equalizer 506, weight coefficient of the sub-carrier of the pilot signal used for the CPE elimination circuit 505 is assigned based on the variance detection, and those sub-carriers of low quality are eliminated. Therefore, even if the sub-carriers of the pilot signal have received the same channel interference of analog TV signals or the CW interference of arbitrary frequency, the interference can be detected and the CPE can be detected with high accuracy. Furthermore, since the interference of the receiving signal of the time domain of the synchronous sequencer 510 is also eliminated by the interference elimination filter 511 based on situations such as the CW interference, the performance of the timing synchronous reproduction by correlation detection of a guard period, or the performance of the AFC of a carrier can be improved, and receiving synchronicity ability can also be improved.

As explained above, according to the first to third embodiments, even if, for example, same channel interference of analog TV signals or the CW interference of arbitrary frequency exists, the receiving performance of the OFDM receiving apparatus can be improved by detecting and removing the interference from the signal used for the reception synchronous reproduction or used for the elimination of the CPE attributed to the career phase noise.

Although the first to third embodiments showed that synchronicity ability is improvable by using the result of the interference detection for the CPE elimination and the synchronous reproduction using the correlation of the guard period, the present inventions are not restricted to these examples. For example, an impulse response is calculated by an inverse Fourier transformation using the sub-carriers of the pilot signal of the frequency domain outputted from FFT circuit, and the impulse response may be used for FFT window control. Therefore, since the impulse response is calculated without using the sub-carriers of the pilot signal which received same channel interference of analog TV signals or the CW interference of arbitrary frequency, the accuracy of the impulse response can be raised and FFT window control can be operated stably.

Moreover, although the first to third embodiments showed that the sub-carrier of the pilot signal is used for the CPE detection, the present inventions are not restricted to this. For example, it is needless to say that it is similarly realizable by performing variance detection from the reference signal point of the Binary Phase Shift Keying (BPSK) modulation data using the data carriers modulated by the BPSK modulation.

Furthermore, each composition element except the A/D converters 102, 202, 502 of the OFDM receiving apparatus shown in the first to third embodiments is configurable by software.

Therefore, the present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for receiving an Orthogonal Frequency Division Multiplex (OFDM) modulated signal, the apparatus comprising:
    an A/D converter converting the received signal to a digital signal;
    a quadrature demodulator performing a quadrature detection of the digital signal converted by the A/D converter and converting the digital signal to a base-band signal of a time domain;
    a fast Fourier transform circuit transforming the base-band signal converted by the quadrature demodulator to a signal of a frequency domain by performing a fast Fourier transformation;
    an equalizer equalizing the signal of the frequency domain transformed by the fast Fourier transform circuit and obtaining demodulated data;
    an error correcting circuit performing an error correction and decoding the demodulated data obtained by the equalizer;
    an interference detector detecting a receiving quality for each predetermined frequency band from the demodulated data obtained by the equalizer; and
    a synchronous sequencer assigning weights to the base-band signal of the time domain outputted from the quadrature demodulator and the signal of the frequency domain outputted from the fast Fourier transform circuit, based on the receiving quality detected in the interference detector, and reproducing a timing synchronized signal and a clock pulse required for the demodulation of the receiving signals.

2. The apparatus of claim 1, wherein the synchronous sequencer detects an error in carrier frequency from the base-band signal of the time domain and the signal of the frequency domain, and supplies a frequency control signal, which cancels the detected frequency error, to the quadrature demodulator.

3. The apparatus of claim 1, further comprising a common phase error elimination circuit assigning weights to the signal of the frequency domain transformed by the fast Fourier transform circuit for each the predetermined frequency band based on the receiving quality, detecting a common phase error in each sub-carrier, and performing a phase rotation to eliminate the common phase error from the signal of the frequency domain.

4. The apparatus of claim 3, wherein the common phase error elimination circuit performs delay detection on the signal of the frequency domain, extracts the sub-carrier of a pilot signal from the signal of the frequency domain performed by the delay detection, assigns weights to the sub-carriers of the pilot signal based on the receiving quality detected by the interference detector and determines the average of internal-symbol, detects the common phase error based on the determined average value, and performs the phase rotation to eliminate the common phase error from the signal of the frequency domain.

5. The apparatus of claim 3, wherein the interference detector detecting the receiving quality for each the predetermined frequency band from the signal of the frequency domain transformed by the fast Fourier transform circuit.

6. The apparatus of claim 5, further comprising an interference elimination filter modifying a frequency band-pass for outputting the signal of the time domain, outputted from the quadrature demodulator to the synchronous sequencer, based on the receiving quality detected by the interference detector.

7. The apparatus of claim 6, wherein the interference elimination filter rejects signals in a frequency band in which the interference detected by the interference detector exists.

8. The apparatus of claim 5, wherein the interference detector detects variance information from a predetermined reference signal point for each sub-carrier and generates a weighting coefficient as the receiving quality based on the variance information.

9. The apparatus of claim 8, wherein the interference detector includes:
  a variance detector detecting the variance information from the predetermined reference signal point for each of the sub-carriers;
  an average value detector calculating the average value of the variance information for each of the sub-carriers; and
  an interference carrier detector generating the receiving quality from the variance information and the average value for each the sub-carrier.

10. The apparatus of claim 3, further comprising an interference elimination filter modifying a frequency band-pass for outputting the signal of the time domain, outputted from the quadrature demodulator to the synchronous sequencer, based on the receiving quality detected by the interference detector.

11. The apparatus of claim 10, wherein the interference elimination filter rejects signals in a frequency band in which the interference detected by the interference detector exists.

12. The apparatus of claim 3, wherein the interference detector detects variance information from a predetermined reference signal point for each sub-carrier and generates a weighting coefficient as the receiving quality based on the variance information.

13. The apparatus of claim 12, wherein the interference detector includes:
  a variance detector detecting the variance information from the predetermined reference signal point for each of the sub-carriers;
  an average value detector calculating the average value of the variance information for each of the sub-carriers; and
  an interference carrier detector generating the receiving quality from the variance information and the average value for each the sub-carrier.

14. The apparatus of claim 1, further comprising an interference elimination filter modifying a frequency band-pass for outputting the signal of the time domain, outputted from the quadrature demodulator to the synchronous sequencer, based on the receiving quality detected by the interference detector.

15. The apparatus of claim 14, wherein the interference elimination filter rejects signals in a frequency band in which the interference detected by the interference detector exists.

16. The apparatus of claim 14, wherein the interference detector detects variance information from a predetermined reference signal point for each sub-carrier and generates a weighting coefficient as the receiving quality based on the variance information.

17. The apparatus of claim 16, wherein the interference detector includes:
  a variance detector detecting the variance information from the predetermined reference signal point for each of the sub-carriers;
  an average value detector calculating the average value of the variance information for each of the sub-carriers; and
  an interference carrier detector generating the receiving quality from the variance information and the average value for each the sub-carrier.

18. The apparatus of claim 1, wherein the interference detector detects variance information from a predetermined reference signal point for each sub-carrier and generates a weighting coefficient as the receiving quality based on the variance information.

19. The apparatus of claim 18, wherein the interference detector includes:
  a variance detector detecting the variance information from the predetermined reference signal point for each of the sub-carriers;
  an average value detector calculating the average value of the variance information for each of the sub-carriers; and
  an interference carrier detector generating the receiving quality from the variance information and the average value for each the sub-carrier.

20. A method of demodulation in an apparatus for receiving an Orthogonal Frequency Division Multiplex (OFDM) modulated signal, the method comprising:
  converting the received signal to a digital signal;
  performing a quadrature detection on the digital signal and converting the digital signal to a base-band signal of a time domain;
  transforming the base-band signal to a signal of a frequency domain by performing a fast Fourier transformation;

equalizing the signal of the frequency domain and obtaining demodulated data;

performing an error correction and decoding the demodulated data;

detecting a receiving quality for each predetermined frequency band from the demodulated data; and assigning weights to the base-band signal of the time domain and the signal of the frequency domain based on the receiving quality, and reproducing a timing synchronized signal and a clock pulse required for the demodulation of the receiving signals.

21. The method of claim 20, further comprising assigning weights to the signal of the frequency domain for each the predetermined frequency band based on the receiving quality, detecting a common phase error in each sub-carrier, and performing a phase rotation to eliminate the common phase error from the signal of the frequency domain.

22. The method of claim 21, wherein in the reproduction of the timing synchronized signal and the clock pulse, signals in a frequency band in which the interference exists are eliminated from the base-band signal of the time domain with an interference elimination filter to modify a frequency band-pass based on the receiving quality.

23. The method of claim 20, wherein in the reproduction of the timing synchronized signal and the clock pulse, signals in a frequency band in which the interference exists are eliminated from the base-band signal of the time domain with an interference elimination filter to modify a frequency band-pass based on the receiving quality.

* * * * *